United States Patent [19]

Veach

[11] 3,760,656
[45] Sept. 25, 1973

[54] AUTOMOBILE CAR DOOR LOCK OPENER AND CLOSER

[76] Inventor: Carlos W. Veach, 8921 Ashcroft Ave., Los Angeles, Calif. 90048

[22] Filed: Dec. 15, 1970

[21] Appl. No.: 98,460

Related U.S. Application Data

[63] Continuation of Ser. No. 757,039, Sept. 3, 1968, abandoned.

[52] U.S. Cl................................. 81/3, 7/9, 254/26
[51] Int. Cl............................................... B25f 1/00
[58] Field of Search .......................... 7/8, 8.1, 9, 12, 7/17; 254/26; 269/321 W; 145/29 R; 81/3

[56] References Cited
UNITED STATES PATENTS

| 63,474 | 4/1867 | Connolly | 145/29 R |
| 2,907,237 | 10/1959 | Casas | 81/3 R |
| 3,340,650 | 9/1967 | Noorlun | 81/3 R |
| 165,671 | 7/1875 | Hagerty | 7/9 |
| 2,759,383 | 8/1956 | Mrazik | 7/17 X |
| 1,339,725 | 5/1920 | Stoke | 269/321 W |
| 3,406,412 | 10/1968 | Kottas | 7/17 |

Primary Examiner—Donald G. Kelly
Attorney—Wilkinson, Mawhinney & Theibault

[57] ABSTRACT

A device adaptable for use by the driver of an automobile for lifting and depressing the lock buttons found on automobile doors from the operator's seat, involving a slide device movable along the window sill by a handle under directivity of the hand of the driver and functioning to enter beneath the lock buttons and elevate the same and also having a mallet, preferably with cushioned striking surface, for driving the buttons down to cause locking of the locking mechanism. In the unlocking function the tool has the capacity to perform camming and levering operations.

4 Claims, 4 Drawing Figures

PATENTED SEP 25 1973　　　　　　　　　　3,760,656

INVENTOR

CARLOS W. VEACH

BY Wilkinson, Mawhinney and Thiebault

ATTORNEYS

AUTOMOBILE CAR DOOR LOCK OPENER AND CLOSER

This application is a continuation of Ser. No. 757,039, filed Sept. 3, 1968, now abandoned.

The present invention relates to Automobile Car Door Lock Opener and Closer and has for an object to supply, to the operator of an automobile, a tool, manually operable from the driver's seat, for performing the functions of lifting the buttons and connected shanks of vehicle door locking mechanisms without compelling the operator to leave the driver's seat, nd alternately to depress such buttons and shanks in the act of locking the vehicle doors against casual or purposeful but unauthorized opening.

Another object of the invention is to supply to the driver of an automobile a simple form of tool easily manipulable at a distance for locking and unlocking vehicle doors, particularly the far doors, measured from the operator's compartment, to the end of promoting safety for the passengers.

A further object of the invention is to furnish a tool for the described purposes mechanically unconnected to the vehicle of a form conveniently kept at hand to the driver and reliable in operation.

With the foregoing and other objects in view, the invention will be more fully described hereinafter, and will be more particularly pointed out in the claims appended hereto.

In the drawings, wherein like symbols refer to like or corresponding parts throughout the several views.

Figure 3:
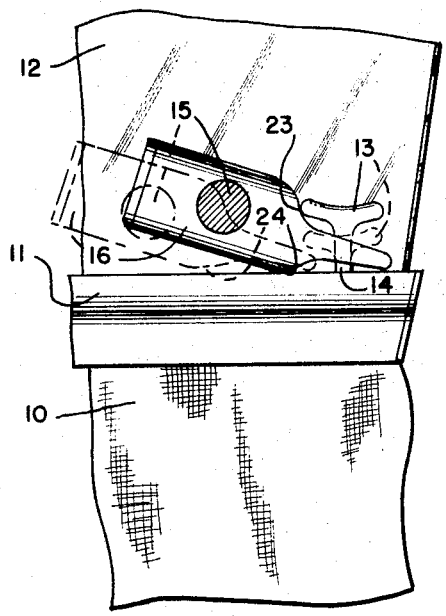
Figure 4:
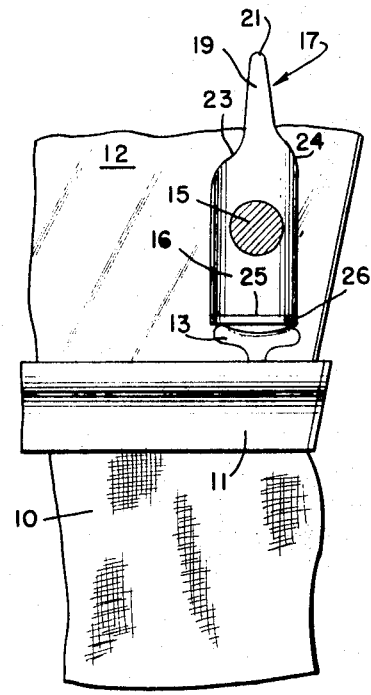

FIG. 3 is a fragmentary inside elevation of a conventional automobile door and locking mechanism illustrating in dotted and full lines successive positions of the tool along a door window sill in the act of effecting opening of the locking mechanism in accordance with a somewhat different sequence of operations; and FIG. 4 is a similar view showing the position of the tool when employed to close the locking mechanism.

Referring more particularly to the drawings, 10 designates, in fragmentary form, an automobile door of present conventional construction having a window sill 11, glass window 12 and a lock button 13 and its shank 14.

In a well-known manner, when the door is closed, by depressing, the button 13 from the position of FIG. 3 (dotted lines) to that of full lines (FIG. 4) the conventional latch mechanism becomes locked against opening of the doors from the outside of the vehicle by the door handles. By lifting the button 13 to the position of FIG. 3 (full lines) the lock mechanism is released, freeing the door latch mechanism for opening of the door by the external door handle.

Figure 1:
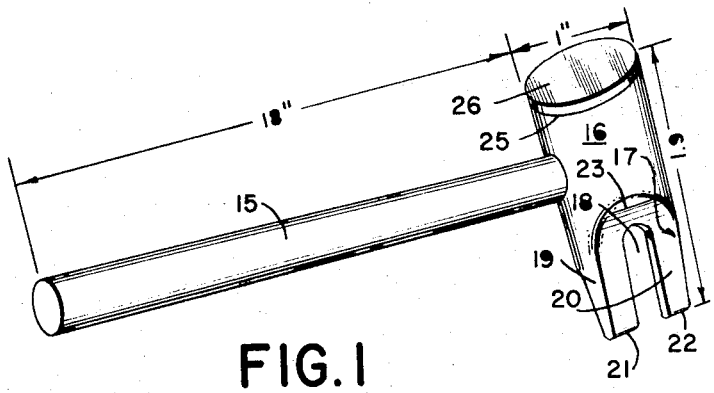
FIG. 1 is a perspective view of a tool constructed in accordance with the invention.
Figure 2:
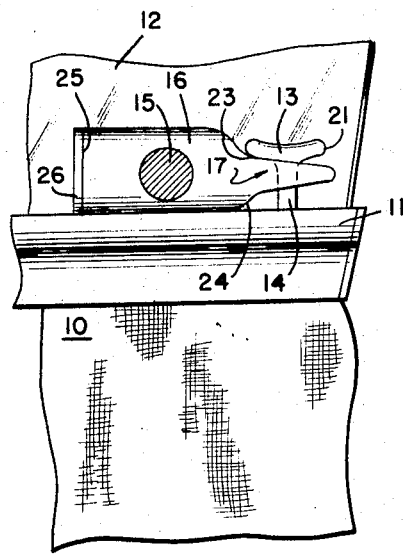
FIG. 2 is a fragmentary inside elevational view of a conventional door and its locking mechanism illustrating in full and dotted lines successive positions of the tool along a door sill in the act of effecting opening of the locking mechanism in accordance with one sequence of operations.

The tool of the invention is carried and manipulated by a long handle 15 non-rotatively affixed in a slide member 16 constructed for sliding movement along the window sill 11 toward and from the locking control mechanism 13, 14 as shown in FIGS. 2 and 3. The slide member 16 carries at its forward portion a forward extension 17 which is bifurcated or slotted with the slot 18 opening through the front end of the forward extension 17, as shown in FIG. 1, resulting in the formation of prongs 19 and 20, the terminal free ends 21 and 22 of which are preferably rounded off to serve as spaced fulcrums on which the tool may be rocked on the window sill and to facilitate entry of the forward extension 17 beneath a depressed button 13.

The upper faces of the prongs 19 and 20 are inclined from the free ends 21 and 22 upwardly toward the slide member 16 terminating in an abruptly rising concave cam surface 23 finally merging into the external surface of the slide member 16.

The lower faces of the prongs 19 and 20 are likewise tapered or inclined from the outer free rounded tips 21, 22 gradually for a distance downwardly (from the aspect of FIGS. 2 and 3) and terminate in a more gently curving convex surface 24 also merging with the external surface of the slide member 16 but at an area generally diametrically opposite the concave cam surface 23. This convex surface 24 offers a fulcrum on which the tool may rock on the window sill to elevate the forked end in the act of prying the button 13 to an upper unlocked position.

In operation, by means of the handle 15 the operator first locates the slide member 16 on the window sill 11 with the forward extension 17 facing the door lock and thereupon manipulates the handle to advance the tool along the sill until the fork of the forward projection 17 arrives at the locking mechanism, inasmuch as the slide member will virtually be guided on a substantially straight line by the window glass 12, although this is not necessary, the slot 18 will be in line, or can easily be manipulated into line, with the shank 14 and made to move beneath the depressed button 13. As the slide member 16 is pushed further along the sill, the gradually rising upper surfaces of the prongs will exert lifting forces beneath the lock button tending to progressively lift the button by a species of camming action. The cam upper surface 23 will contribute a final abrupt lifting force beneath button 13 of great magnitude insuring the dislodgment of any frictionally bound shank 14.

To gain even greater lifting force, by a twist of the wrist the operator may cause the slide member 16 to rock on the fulcrum 24 into the position of FIG. 3, thus lowering the forward extension 17 prior to entry beneath the button 13 and after entry reversing the twist to lower slide member 16 and elevate the forward extension 17 directly beneath the button 13 thus jacking up the locking device and freeing the door latch mechanism.

As to the physical attributes of the device, the slide member 16 will be of substantial mass (weight) being preferably solid of cast iron so that its mass times velocity (MV) equation will be proportional to the work it is calculated to perform in the hand of the operator. The weight is supported by the door sill but the coefficient of friction between the slide member and door sill will be at a minimum due to the fact that the slide member is preferably externally a cylinder with its axis disposed parallel to the door sill in its position thereon and therefore there is only line contact between the slide member and sill. The handle is preferably of wood so that the weight is confined largely to the slide member 16 and its extension 17.

By an up and down movement of the handle the slide member may be rotated about its axis causing lateral tilting back and forth of the forked extension 17, lifting the prongs 19 and 20 alternately from the sill 11 and thus imparting lifting moments to the underside of the button 13 first at one side, then subsequently at the opposite diametric side resulting in successive canting actions on the button 13 tending to more effectively free the button and its stem or shank 14 from a laterally jammed condition.

When the slide member has been lifted to the position of FIG. 3, the lateral tilting or rocking action will be in part at least supported by the free end fulcrum 21, 22, and by lifting the convex fulcrum 24 wholly from the supporting surface (window sill 11) the entire lateral rocking back and forth of the members 16 and 17 will be supported by the free rounded ends 21, 22 of the prongs. Thus, the tool lends itself to a variety of movements all effective to exert quick and easy dislodgment of the button 13 and its shank 14 from a locked condition.

The cylindrical form of the slide member is also favorable to the formation of a circular mallet head 25 at the end opposite the extension 17 which is useful in depressing the lock buttons 13 as shown in FIG. 4. Preferably an elastomeric disc 26 is secured over the mallet face to cushion the shock of the mallet blows on the lock button 13 which are made in most cases of plastic material.

The head 16 may be completely symmetrical so that the two sides of the bifurcated end may be identical, although this is not essential but is convenient primarily for ease in casting the part.

Although I have disclosed herein the best forms of the invention known to me at this time, I reserve the right to all such modifications and changes as may come within the scope of the following claims.

What is claimed is:

1. For use with the locking mechanism for automobile doors including a button and dependent shank slidable up and down in the door structure and projecting above the window sill, a car door lock opener operable from the driver's seat for lifting the button and shank to unlock the door locking mechanism comprising:
   a. a weighted slide member having substantially unobstructed outer surface walls,
   b. an elongated handle attached to one side of said slide member,
   c. bifurcated means on a forward extension of said weighted slide member at a right angle to said handle, said bifurcated means comprising prongs extending substantially in a plane along the axis of the handle and being spaced relative to one another so that the slot defined between the prongs is of a width to surround the shank of the locking mechanism,
   d. said forward extension on the slide member having a lower surface cut away and lying in a plane spaced above the plane of the lower edge of the slide member, and
   e. a fulcrum at the meeting lower edge of the slide member and its forward extension so that the slide member is rockable up and down for initial convenient entry of the forward extension beneath the button and a final rocking of said extension upwardly to pry the button and entrained shank up to release the lock.

2. A device as claimed in claim 1 further comprising
   g. a hammer head on the handle offset angularly from the claw by which through the raising and lowering movement of the free end of the handle a blow or blows may be delivered to the button for driving same down to cause locking of the door.

3. For use with the locking mechanism for automobile doors including a button and dependent shank slidable up and down in the door structure and projecting above the window sill, an article of manufacture comprising, a device operable from the driver's seat for lifting the button and shank to unlock the mechanism comprising
   a. a slide member adapted to slide along the window sill,
   b. a handle attached to the member and reaching at least to the extended hand of the operator whereby the operator may conveniently cause the slide member to slide along the sill and engage the button,
   c. means on the member for lifting the button and entrained shank incident to the sliding movement of the member along the window sill toward the button whereby to release the locking mechanism comprising
   d. a forward extension on the slide member adapted to enter beneath the button and having an upper edge inclining from its free end upwardly toward the slide member for automatically effecting raising movement of the button as the slide moves along the window sill toward and beneath said button, said member having,
   e. an abruptly raised surface adjacent to and inwardly of the upper edge of the forward extension for imparting a final abrupt lifting force to the button and the shank of great magnitude to overcome any friction between the shank and the door structure to insure the dislodgment of the button and shank during the final stage of the sliding movement of the slide member toward and beneath the button, said member having,
   f. a lower edge inclining downwardly toward the slide member and said member also having,
   g. a gently curving convex surface adjacent to and inwardly of the lower edge of the forward extension to provide a lower fulcrum on which the slide member may be rocked on the window sill to elevate the forward extension in the act of prying the button and shank to an upper-unlocked position, the extension further having,
   h. a slot opening through the outer end of the extension with prongs at the sides of the slot adapted to extend beneath opposite sides of the button while the shank occupies the slot, said prongs being substantially parallel to one another so that the slot is of uniform width throughout its entire length, and
   i. the ends of said prongs having rounded off surfaces.

4. A device as claimed in claim 3 further comprising
   j. means on the slide member for driving the button and shank downwardly to cause locking of the mechanism, said slide member and said driving means being of substantial weight so that their mass times velocity (MV) equation will be proportional to the work it is calculated to perform in the hand of the operator.

* * * * *